Patented Sept. 19, 1933

1,927,776

UNITED STATES PATENT OFFICE 1,927,776

METHOD OF IMPREGNATION FOR PRESERVING WOOD BY TREATMENT OF LIVING STANDING TREES

Hans Habegger, Wiedlisbach, Switzerland, assignor to Hans Erich Habegger, Wiedlisbach, Switzerland No Drawing. Application August 18, 1932, Serial No. 629,400, and in Switzerland August 18, 1931

2 Claims. (Cl. 47—58)

This invention relates to processes for preserving timber, poles for overhead lines and similar objects against rotting and decay, and particular reference is made to a method of impregnation for preserving wood by treatment of living, standing trees.

Suggestions have already been made to impregnate and dye the wood of living trees but those known processes may all be considered as improvements or derivations of the method of Boucherie who replaces the natural sap of the tree by an impregnation agent pressed into the just felled trunk of the tree. The impregnation of living, standing trees is done in a similar way: The natural flow of the sap is partially cut off and a supply of impregnation chemicals is inserted whereupon the pressure of the rising sap forces said chemicals through the entire upper part of the tree. These methods, however, have several disadvantages. On account of the large zone of treatment a great quantity of wood will be lost and the standing power of the tree is very much lessened because most of the fibres are cut through. Further the work has to be done by a skilled workman who has to spend several hours with each tree.

The purpose of the present invention is to create a method which avoids the above stated inconveniences and which is based on a different theory. Plants affected by germs of decay or pests develop automatically antidotes which in many cases will suffice to keep the plants in a sound state. In case of insufficient antidotes medicaments or impregnation agents must be introduced artificially. If the wood of a tree is to be used for construction purposes or for poles for overhead lines, the sap of the still living tree must be poisoned so that the fungi attacking dead wood may have no effect. For this latter purpose the necessary amount of impregnation agent will of course kill the treated tree and the latter will wither and die.

The object of the present invention is a method of impregnation for preserving wood by treatment of living, standing trees according to which the impregnation agent is filled into a single bore-hole which is downwardly inclined, passing through the bark and the sap-wood, and extending into the heart of the tree, the impregnation with said agent, which is absorbed by the sap and diffused through the entire organism of the plant, is continued until the desired state of treatment is attained.

In carrying out the invention for the impregnation of trees, the wood of which is to be used for construction material, the concentration and quantity of the impregnation agents is increased in order to cause the trees to die.

Tests and experiences have proved that the best impregnation agents for this purpose are aqueous solutions of sodium fluoride and sodium nitro-chlorophenol which agents do not coagulate the sap and do not destroy the natural antidotes contained therein. These solutions are filled in bore-holes which are downwardly inclined and touch the heart-wood of the tree, so that all parts of the tree, bark, sapwood and heart, come in contact with the liquid which is daily replenished during a month. The concentration of the solutions must be greater for coniferous trees containing little water than for foliage-trees having a great content of water.

The execution of the method according to the present invention is a very simple one and may be done by any unskilled person. All that is needed is the drilling of an inclined hole in the tree trunk or limb which remains open after the solution has been filled in. One single workman may treat several hundreds of trees daily. By drilling one hole only, which may be smaller or bigger according to the size of the tree, a minimum of wood is wasted and the standing power is by no means reduced.

What I claim as my invention is:—

1. The method of preserving wood of living, standing trees by impregnation, which consists in drilling into the trunk of a tree a downwardly inclined hole passing through the bark and the sap-wood and ending in the heart of the tree, and in filling said bore-hole with a treating liquid comprising sodium nitro-chlorophenol, the said liquid being absorbed by the natural saps and diffused through the entire organism of the tree, the filling in of said liquid being continued until the desired state of treatment is attained.

2. The method of preserving wood which consists in drilling a downwardly inclined hole into the trunk of a tree, said hole ending in the heart of the tree, and then filling the hole with an impregnation agent comprising sodium nitro-chlorophenol, the application of this agent for the entire organism of the tree being continued until the tree is dead.

HANS HABEGGER.